UNITED STATES PATENT OFFICE.

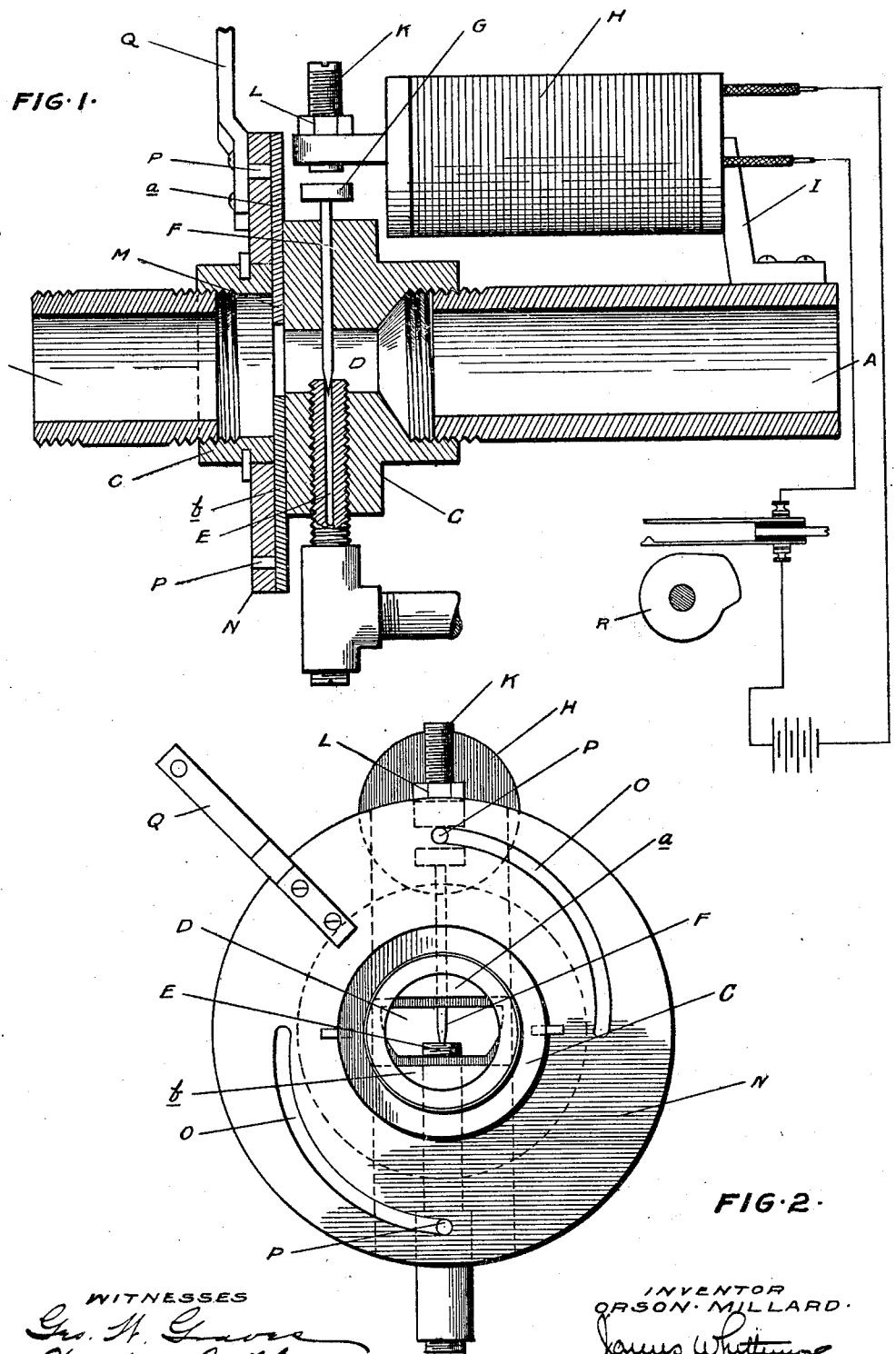

ORSON MILLARD, OF FLINT, MICHIGAN.

CARBURETER.

No. 806,822.　　　Specification of Letters Patent.　　　Patented Dec. 12, 1905.

Application filed April 18, 1905. Serial No. 256,323.

*To all whom it may concern:*

Be it known that I, ORSON MILLARD, a citizen of the United States, residing at Flint, in the county of Genesee and State of Michigan, have invented certain new and useful Improvements in Carbureters, of which the following is a specification, reference being had therein to the accompanying drawings.

The invention relates to carbureters especially designed for use in connection with explosion-engines; and the invention consists in the novel construction of the means employed for controlling the supply of liquid fuel.

In the drawings, Figure 1 is a longitudinal section through the carbureter, and Fig. 2 is an end elevation thereof.

A is the air-induction conduit, which is arranged in line with a suction-conduit B, leading to the cylinder of the engine.

C is a fitting connecting the conduits A and B and affording a restricted air-passage D between said conduits.

E is the inlet-pipe for the liquid fuel which enters the restricted passage D, and F is a valve controlling the discharge from the conduit E.

The valve F is preferably in the form of a conical pin seated in the end of the tube E and extending upward through the bearing in the fitting C out from the same.

G is a head at the upper end of the valve-stem F, which constitutes the armature of an electromagnet H. This magnet is mounted above the conduit A, preferably by a bracket I secured thereto, and has a pole-piece J projecting from the core of the magnet. The end of this pole-piece J is apertured in alinement with the stem F and is threaded to receive the adjustably-threaded extension pole-piece K. This extension-piece K may be raised or lowered in relation to the armature G by screwing it up or down and may be locked in different positions of adjustment by the lock-nut L.

M is a gate-valve for variably restricting the air-passage between the conduit A and the conduit B, which, as shown, comprises two sections $a$ and $b$, which are oppositely slidable in ways in the fitting C. The sections are operated by suitable means, such as the rotary cam N, which is sleeved upon the fitting C and is provided with eccentric slots O engaging the pins P, secured, respectively, to said sections $a$ and $b$. The cam N is operated by a handle Q, which may be connected by any suitable mechanism (not shown) so as to be under the control of the operator.

The electromagnet H is included in an electric circuit, which, as indicated diagrammatically in Fig. 1, includes a circuit-closer R, operated by a suitable part of the engine mechanism. The timing of this circuit-closer is such that the circuit is closed to energize the magnet H at the period when an air-suction is created by the piston in the cylinder and is then drawing the air-current through the conduits A and B. When the magnet is thus energized, the armature G will be attracted by the pole-piece K and will be lifted so as to open the oil-inlet conduit E and permit the oil to be atomized by the air-current passing through the restriction D. As soon as the electric circuit is broken the valve F will return to its seat, preventing further inlet of oil.

By adjusting the screw K the distance between the same and the armature G may be varied so as to alter the lift of the valve. Thus in addition to its function as a pole-piece the screw K operates as a stop controlling the movement of opening of the valve.

The gate-valve M operates as the throttle and is controlled in the usual way with carbureters for this purpose.

What I claim as my invention is—

1. In a carbureter, the combination with an air-induction conduit, of an oil-inlet connected therewith, a valve controlling said air-inlet, an electromagnet for lifting said valve and means for energizing said magnet during the induction of air.

2. In a carbureter, the combination with an oil-inlet, of a valve controlling the same, an electromagnet for lifting said valve, and an adjustable pole-piece for said magnet forming a stop for limiting the lift of the valve.

3. In a carbureter, the combination with an oil-inlet conduit, of a valve controlling the same, an armature connected with said valve, an electromagnet, a pole-piece projecting therefrom, and a screw constituting an extension of said pole-piece adjustable toward or from said armature.

In testimony whereof I affix my signature in presence of two witnesses.

ORSON MILLARD.

Witnesses:
WILLIAM W. BLACKNEY,
FANNIE A. BEECHER.